(12) United States Patent
Hazucha

(10) Patent No.: US 6,600,296 B2
(45) Date of Patent: Jul. 29, 2003

(54) METHOD AND SEMICONDUCTOR DIE WITH MULTIPLE PHASE POWER CONVERTER

(75) Inventor: Peter Hazucha, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/010,790

(22) Filed: Nov. 13, 2001

(65) Prior Publication Data

US 2003/0090252 A1 May 15, 2003

(51) Int. Cl.$^7$ .............................. H02M 7/00; G05F 1/40; G05F 1/455
(52) U.S. Cl. ...................... 323/237; 323/242; 363/65; 363/71
(58) Field of Search ................................ 323/237, 242; 363/65, 71

(56) References Cited

U.S. PATENT DOCUMENTS

| 5,418,707 A | * | 5/1995 | Shimer et al. ................ 307/82 |
| 5,793,628 A | * | 8/1998 | Koch ........................ 363/152 |
| 6,222,745 B1 | * | 4/2001 | Amaro et al. ............... 323/285 |

OTHER PUBLICATIONS

"Microprocessor CORE Voltage Regulator Multi-Phase Buck PWM Controller", *intersil, Data Sheet, HIP6301, File No. 4765.1*, 1–16, (Mar. 2000).

Chen, W., "High Efficiency, High Density, PolyPhase Converters for High Current Applications", *Linear Technology, Application Note 77*, AN77–1–AN77–16, (Sep. 1999).

Chung, H., et al., "Development of a Switched–Capacitor DC/DC Boost Converter with Continuous Input Current Waveform", *IEEE Transactions on Circuits and Systems–I: Fundamental Theory and Applications*, vol. 46, 756–759, (Jun. 1999).

Chung, H., et al., "Inductorless DC/DC Boost Converter Using Switched–Capacitor Circuit", *1997 IEEE International Symposium on Circuits and Systems, Hong Kong*, 925–928, (Jun. 1997).

\* cited by examiner

Primary Examiner—Bao Q. Vu
(74) Attorney, Agent, or Firm—Schwegman, Lundberg, Woessner & Kluth, P.A.

(57) ABSTRACT

An on-die multiple phase power converter reduces output voltage ripple and reduces input current ripple while allowing for higher input voltage and reduced input current to a circuit board. The on-die multiple phase power converter also allows for more than one supply voltage on a die. The converter includes a plurality of single phase switching blocks and a clock signal phase generator. The single phase switching blocks receive phase-shifted clock signals from the clock signal phase generator and provide an output voltage. The output currents of the single phase switching blocks may combine to form a single output to provide current to one or more functional unit blocks on the semiconductor die. One or more or the single phase switching elements may be combined to provide current to one or more functional unit blocks on the semiconductor die.

27 Claims, 10 Drawing Sheets

METHOD AND SEMICONDUCTOR DIE WITH MULTIPLE PHASE POWER CONVERTER

FIELD OF THE INVENTION

The present invention pertains to DC to DC switching power converters on semiconductor die, and more particularly to on-die power conversion using multiphase power converters.

BACKGROUND OF THE INVENTION

DC to DC switching power converters are commonly used to convert one available DC voltage to another DC voltage, often needed for a particular set of semiconductor dies. Such power converters may use one or more electrically controlled switches, such as N- or P-Channel MOSFETs. The gates of the MOSFETs are controlled by a controller circuit which is often integrated onto a single semiconductor die. As electronic devices become faster, smaller and more portable, the need for increased electrical efficiency in DC to DC converters is becoming more important. Relatively small increases in electrical efficiency of power converters may result in much greater overall efficiency improvements in electronic systems.

Furthermore, the operating voltage of high speed microprocessors is reduced, device dimensions shrink. This allows semiconductor die to operate at higher frequencies and the number of transistors integrated on a single semiconductor die to increase. Therefore, more power is consumed by semiconductor die consume from a power supply. The current supply paths carrying current to a semiconductor die through a circuit board must carry proportionally more current as the voltage level decreases. As a result, the parasitic elements of the current path to a semiconductor die become more pronounced. For example, narrower track widths along with increased current result in increased series resistance and inductance producing increased ripple, power loss and voltage drop. Furthermore, increased current may requires a greater number of package pins and circuit pads for a die and reduces interconnect reliability.

Thus there is a general need for an improved power converter and power conversion method. There is also a need for an on-die power converter and power conversion method that reduce input noise and output voltage ripple. There is also a need for an on-die power converter and power conversion method that reduces area on a semiconductor die without reducing power-converter performance. There is also a need for an on-die power converter and power conversion method that allows circuit-board voltage regulation modules to provide higher voltage reducing the parasitic effects. There is also a need for an on-die power converter and power conversion method that reduces the number of pins required by a semiconductor die. There is also a need for an on-die power converter and power conversion method that improves interconnect reliability. There is also a need for an on-die power converter which generates one or more on-die voltages different from a voltage supplied to the die from an off die source.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

Figure 1:
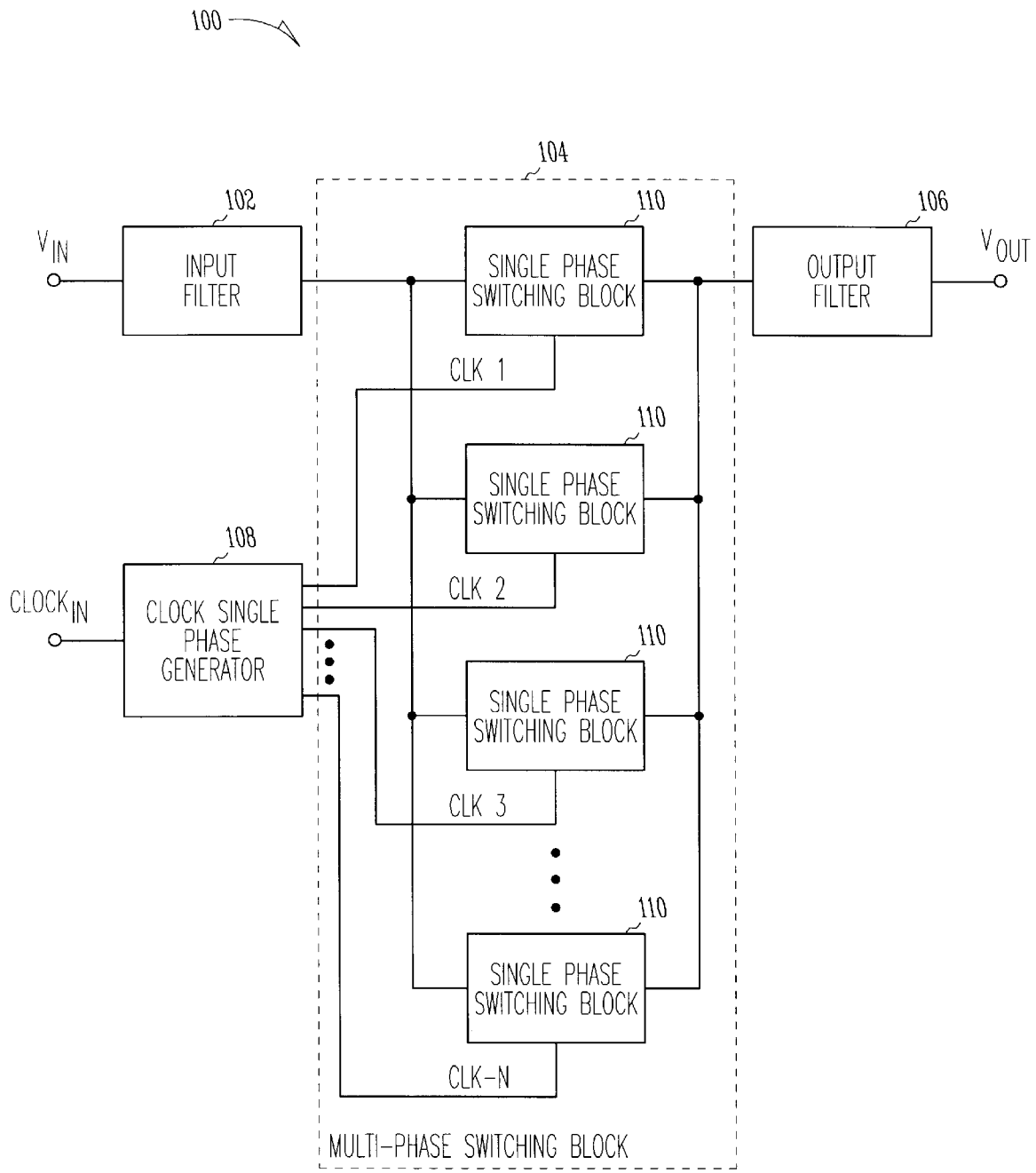
FIG. 1 is a functional block diagram of a multiphase power converter in accordance with an embodiment of the present invention.

The description set out herein illustrates the various embodiments of the invention and such description is not intended to be construed as limiting in any manner.

DETAILED DESCRIPTION

The present invention is related to switching power converters fabricated on semiconductor die. The present invention reduces the impact of scaling on power delivery by allowing a higher external power supply voltage with lower input current levels at the pins of a chip (i.e., semiconductor die) package. An on-die DC to DC power converter thus generates, for example, the lower voltage and higher current required for the on-die circuitry. The present invention provides, in one aspect, an improved on-die power converter and in another aspect, and improved power conversion method. The present invention, in accordance with another aspect, also provides an on-die power converter and power conversion method that reduces input noise and output ripple. The present invention, in accordance with another aspect, also provides an on-die power converter and power conversion method that requires less area on a semiconductor die without reducing power converter performance. The present invention, in accordance with another aspect, also provides an on-die power converter and power conversion method that allows circuit board voltage regulation modules to provide higher voltage and lower current levels reducing the effects of parasitics. The present invention, in accordance with another aspect, also provides an on-die power converter and power conversion method that reduces the number of pins required by a semiconductor die. The present invention, in accordance with another aspect, also provides an on-die power converter and power conversion method that improves interconnect reliability. In accordance with another aspect, the present invention allows a portion of functional unit blocks on a semiconductor die to receive lower voltage to conserve power.

In one embodiment, an on-die multiple phase power converter includes a plurality of single phase switching blocks and a clock signal phase generator. The single phase switching blocks receive phase-shifted clock signals from the clock signal phase generator and provide an output voltage. In this embodiment, each single phase switching block has first and second switching elements and a charge storage element. The first switching element supplies energy to the charge storage element during a first portion of the phase-shifted clock signal to draw input current, and the second switching element removes energy from the charge storage element during a second portion of the phase-shifted clock signal to provide output current. In an embodiment that includes N single phase switching blocks and when the phase-shifted clock signal has a period (T), each phase-shifted clock signal may be shifted in phase by an amount substantially equal to T/N. The charge storage element may be comprised of one or more capacitive or inductive elements. The single-phase switching blocks may comprise any conventional DC to DC power converter.

In another embodiment, a semiconductor die includes multiple functional unit blocks and a multiphase power converter to provide an output voltage for the functional unit blocks. In this embodiment, the multiphase power converter includes a plurality of single phase switching blocks and a clock signal phase generator to provide a phase-shifted clock signals to each of the single phase switching blocks.

In yet another embodiment of the present invention, a semiconductor die has a plurality of functional unit blocks, a plurality of single phase switching blocks which provides power to corresponding ones of the functional unit blocks, and a clock signal phase generator which provides a phase-shifted clock signal to each of the single phase switching blocks. In this embodiment, a multiphase switching block provides power to another functional unit block. The multiphase switching block may receive at least two phase-shifted clock signals from the clock signal phase generator.

In yet another embodiment, a method for regulating voltage to functional unit blocks of a semiconductor die includes generating plurality of phase-shifted clock signals. The phase-shifted clock signal may be provided to one of a plurality of single phase switching blocks. An output voltage is generated by each single phase switching block during a portion of a clock cycle. The output voltages of the single phase switching blocks are combined to provide a regulated input voltage for the functional unit blocks.

FIG. 1 is a functional block diagram of a multiphase power converter in accordance with an embodiment of the present invention. Multiphase power converter 100 may include input filter 102 to receive input current from an input voltage source, and multiphase switching block 104 to receive input current and phase-shifted clock signals and to provide an output voltage. Multiphase power converter 100 may also include output filter 106 to receive the output voltage from multi phase switching block 104 and provide a filtered voltage output. Multiphase power converter 100 also includes clock signal phase generator 108 to generate the phase-shifted clock signals. In accordance with one embodiment, multiphase switching block 104 is comprised of a plurality of single phase switching blocks 110. Each of single phase switching blocks 110 receives one of the phase-shifted clock signals from clock signal phase generator 108. Input filter 102 and output filter 106 are optional elements and need not be included depending on the particular application for which multiphase power converter 100 is intended.

Each single phase switching block 110 receives a clock signal and draws input current during a first portion of the clock cycle. Each single phase switching block 110 also provides current during a second portion of the clock cycle. Because each clock signal provided to the various single phase switching blocks is shifted in phase, the current drawn by each successive single phase switching blocks is also shifted in phase, allowing the combination of single phase switching blocks 110 to draw a more level input current over an entire clock cycle and to provide a more level output voltage over the clock cycle. In accordance with one embodiment, when power converter 100 has N single phase switching blocks 110 and the clock signal has a period (T), each phase-shifted clock signal may be shifted in phase by an amount substantially equal to T/N. The number N of single phase switching blocks 110 may range from two up to a hundred or more, although less than ten single phase switching blocks 110 may be suitable for many applications.

In accordance with one embodiment of the present invention, N switching blocks 110 occupy an area on a semiconductor die. Without substantially changing the input and output requirements of multiphase power converter 100, the area of semiconductor die occupied by the N switching blocks may not substantially change as N is changed. In other words, each single phase switching block 110 occupies about 1/Nth of the area. However, the reduced ripple that results from increasing N allows for the elimination of input filter 102 and output filter 106 which may reduce the die area.

In accordance with one embodiment of the present invention, power converter 100 allows an external voltage regulation module to provide higher input voltage levels with lower input current to a semiconductor die. In this embodiment, power converter 100 converts the higher input voltage levels with lower input current to a lower voltage and higher current for use on the semiconductor die, but this is not a requirement. For example, a group of functional unit blocks on a die supplied by an on-die power converter of the present invention may operate at about 100% of Vin while another group of functional unit blocks on the die supplied by another power converter of the present invention may operate at, for example, 70% of Vcc. Vcc may range between 0.5 v and 2.0 v, although higher supply voltages are also suitable.

Figure 2:
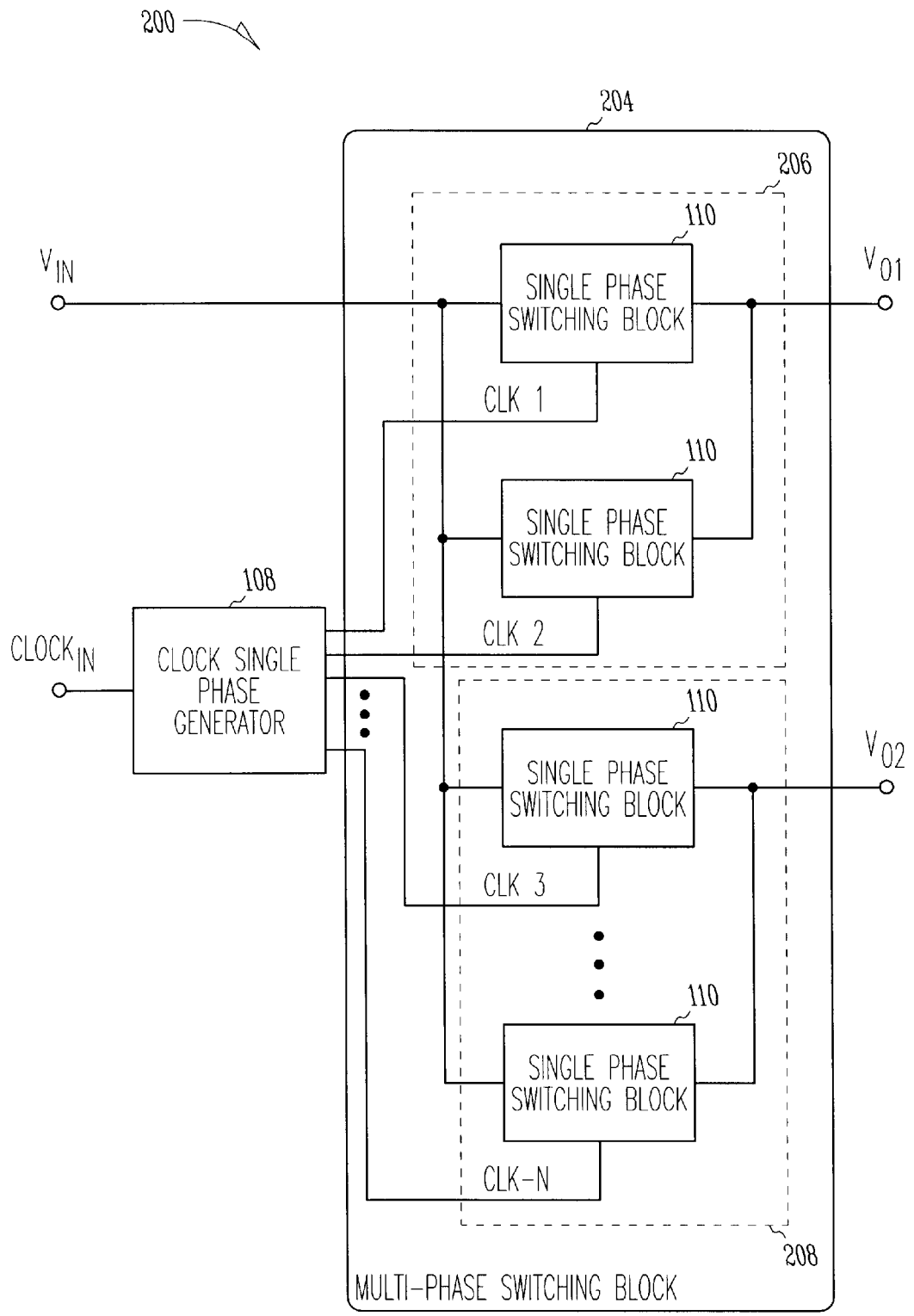
FIG. 2 is a functional block diagram of a multiphase power converter in accordance with another embodiment of the present invention.

FIG. 2 is a functional block diagram of a multiphase power converter in accordance with another embodiment of the present invention. In accordance with this embodiment, multiphase power converter 200 includes a multiphase switching block 204 comprised of a first portion 206 of single phase switching blocks 110 which provides output current at a first output (Vo1), and second portion 208 of single phase switching blocks 110 which provides output current at a second output (Vo2). The number of single phase switching blocks 110 included in either first portion 206 or second portion 208 may vary depending on an anticipated current load at the particular output. For example, when the output of first portion 206 of single phase switching blocks 110 is anticipated to require greater current than the output of second portion 208, first portion 206 may include more single phase switching blocks 110. First and second output voltages (Vo1 and Vo2) may provide the same voltage level output or alternatively, may provide different voltage level outputs.

Although multiphase power converter 200 is illustrated in FIG. 2 as having only two portions of single phase switching blocks 110 to provide two output voltages, other embodiments of the present invention include a multiphase power converter having more than two portions of single switching blocks, each providing a separate output.

Each single phase switching block 110 is provided one of the phase-shifted clock signals from clock signal phase generator 108. Clock signals from clock signal phase generator 108, however, may be distributed to single phase switching blocks 110 in many ways and nothing requires that clock signals of earlier phases be provided to first portion 206 of single phase switching elements 110 and the later phases be provided to second portion 208 of single phase switching elements 110. In one embodiment of the present invention, phases of the clock signals are more evenly distributed among portions 206, 208 of single phase switching elements 110 to help reduce fluctuations in the total input current of converter 200 as well as help reduce fluctuations in output voltages.

In one embodiment of the present invention, more than one or several of single phase switching blocks 110 are provided the same phase from clock signal phase generator 108. In this embodiment, when N is the number of phases of the clock signal provided by clock signal phase generator 108, the number of single phase switching blocks may be greater than N.

In one embodiment of the present invention, output Vo1 provides current to a first set of functional unit blocks of a semiconductor die, and output Vo2 provides current to a second set of functional unit blocks on the semiconductor die. Output Vo1 may provide its output current through a first power grid of the semiconductor die while output Vo2 may provide it's output through a second power grid of the semiconductor die.

The single phase and multiphase switching blocks may have different sizes depending on load requirements. Switches and storage elements of each switching block can also be sized independently because of the distributed supply circuitry and distributed load circuitry. The total area of the single phase switching blocks may be less than a total area of similar prior-art single-phase DC to DC converters.

DC to DC converters may achieve power conversion by employing energy storage elements such as capacitors and/or inductors along with switching devices such as diodes, MOS transistors, and bipolar transistors. DC to DC converters may employ discrete components and capacitors and/or inductors may be used as energy storage elements. In accordance with the embodiments of the present invention, ondie capacitors, on-die inductors or a combination thereof are used as the energy storage elements. Desirably, energy storage elements available in a CMOS process are utilized.

In one embodiment, single phase switching block 110 draws current during a first portion of a clock cycle and provides current during a second portion of a clock cycle. In another embodiment, single phase switching block 110 draws current during a first portion of a clock cycle, and provides current during a first and second portion of a clock cycle. In yet another embodiment, single phase switching block 110 draws current during a first and second portion of a clock cycle, and provides current during the first and second portions of a clock cycle.

Figure 3:
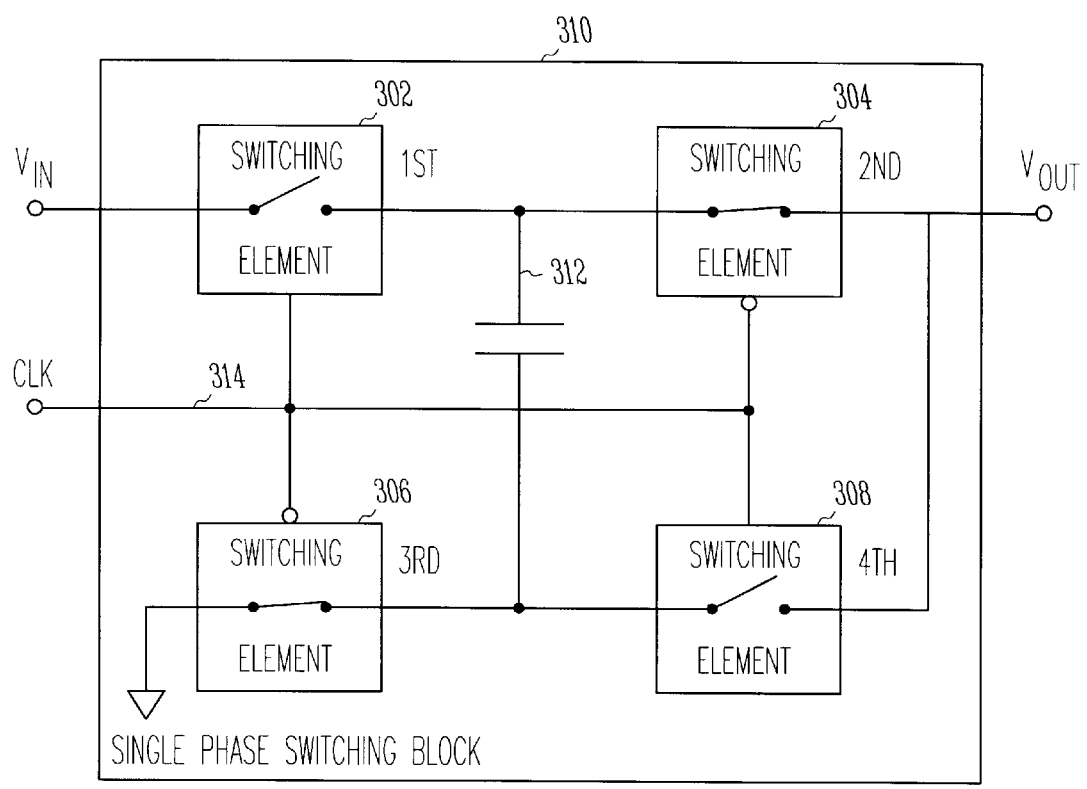
FIG. 3 is a functional block diagram of one of many conventional single phase switching blocks suitable for use with the present invention.

FIG. 3 is a functional block diagram of one of many conventional single phase switching blocks 310 suitable for use with the present invention. Other single phase switching blocks may be used for single phase switching blocks 110 (FIG. 1, FIG. 2) without departing from the intent of the present invention. Single phase switching block 310 includes first switching element 302 and second switching element 304 coupled with charge storage element 312. Single phase switching block 310 may also include third switching element 306 and fourth switching element 308. First switching element 302 conducts to draw input current and fourth switching element 308 conducts to provide output current during a first portion of a clock cycle. During a second portion of the clock cycle, second switching element 304 and third switching element 306 conduct to provide output current to a load. First switching element 302 and fourth switching element 308 conduct together during a first portion of a clock cycle, while second switching element 304 and third switching element 306 conduct together during a second portion of the clock cycle. Switching elements 302, 304, 306 and 308 may be controlled by clock signal 314 and may be configured to conduct during either a first or second portion of a clock cycle as appropriate. For example, switching elements 302 and 308 are shown with non-inverted inputs while switching elements 304 and 306 are shown with inverted inputs. This illustrates that switching elements 302 and 308 conduct during a portion of the clock cycle when switching elements 304 and 306 do not conduct, and conversely, that switching elements 302 and 308 do not conduct during a portion of the clock cycle when switching elements 304 and 306 do conduct. Clock signal 402 (FIG. 4) is an example of suitable clock signal for single phase switching block 310.

Switching elements 302, 304, 306 and 308 may be comprised of any element suitable for operating as a switch. For example, switching elements 302, 304, 306 and 308 may be comprised of PMOS or NMOS MOSFET transistors. It is usually desirable that these switching devices have a low switch resistance. On-die switch resistance is substantially a function of the CMOS process and area of the switch.

Charge storage element 312 may include any element that provides capacitance. For example, the gate capacitance of PMOS or NMOS MOSFET transistors may be used for charge storage element 312. In other embodiments of the present invention, single phase switching block 310 may include inductive or other elements for storing energy.

Figure 4:
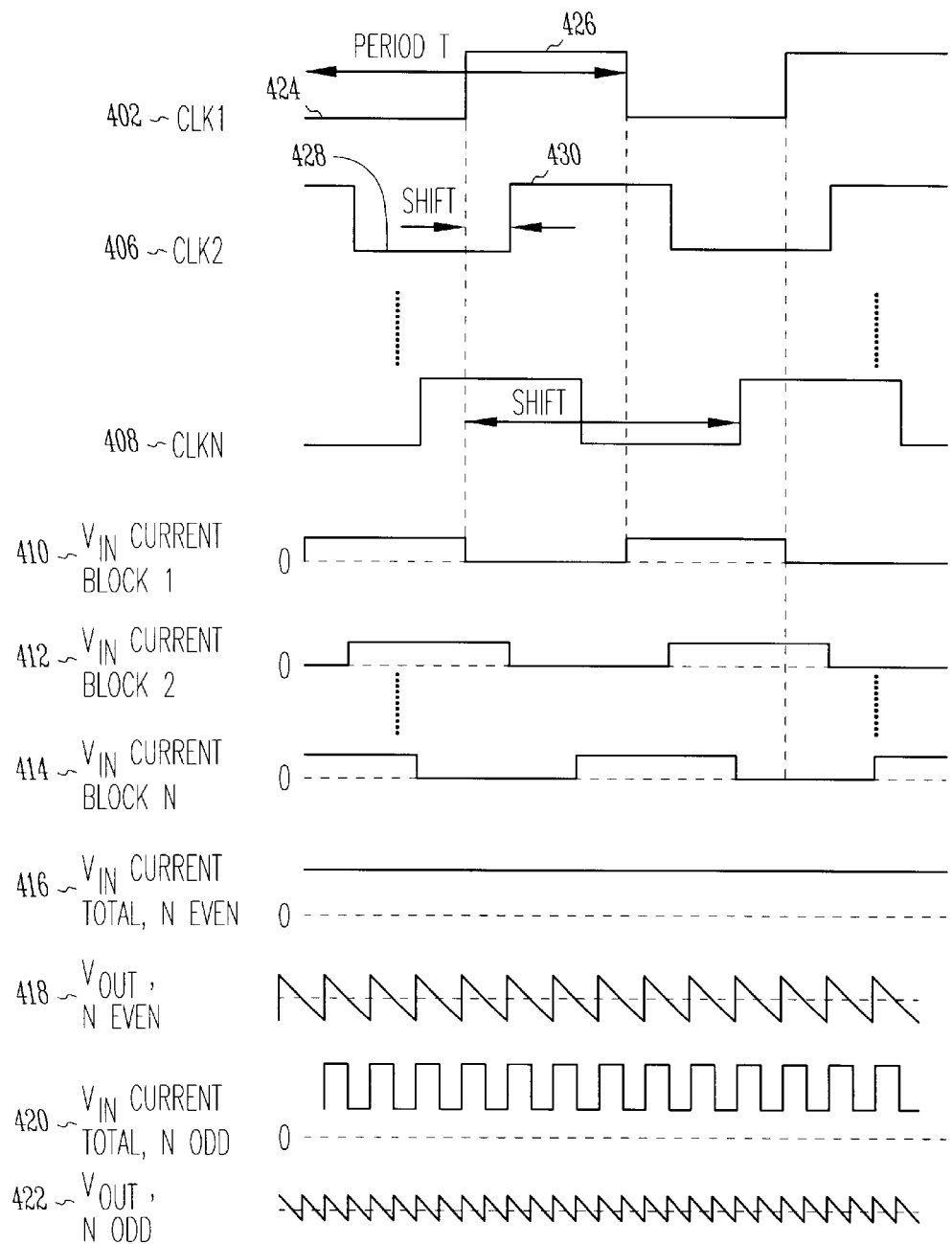
FIG. 4 illustrates various signals of a multiphase power converter in accordance with an embodiment of the present invention.

FIG. 4 illustrates various signals of a multiphase power converter in accordance with an embodiment of the present invention. Clock signals 402 through 408 represent various clock signals which may be provided by clock signal phase generator 108 (FIG. 1). Each clock signal has a period T and is shifted in phase by a predetermined amount. In one embodiment, the amount of phase shift each clock signal is shifted by is about equal to T/N. N is a number of different clock phases available to single phase switching blocks 110 (FIG. 1). Although clock signals are illustrated with a 50% duty cycle, the present invention is equally applicable to use with clock signals of other duty cycles. Furthermore, other phase shift amounts for the phase-shifted clock signals are also suitable for use with the various embodiments of the present invention.

Signals 410, 412 and 414 illustrate input current drawn by signal phase switching blocks corresponding with receipt of clock signals 402, 406 and 408 respectively. For example, a first single phase switching block receiving clock signal 402 may draw input current in accordance with current signal 410 during first portion 424 of clock signal 402 and may draw no input current during second portion 426 of the clock signal 426. Likewise, a second single phase switching block receiving clock signal 406 may draw input current in accordance with current signal 412 during first portion 428 of clock signal 406 and may draw no current during second portion 430 of clock signal 406. Because clock signal 406 provided to the second single phase switching block is phase shifted, the corresponding input current signal 412 is also phase shifted.

Signal 416 illustrates the sum of the input currents for a plurality of N single phase switching blocks when N is an even number. Signal 420 illustrates the sum of the input currents for a plurality of N single phase switching blocks when N is an odd number. An even number single phase switching element provides a substantially level input current draw illustrated by signal 416 because at any given time, an equal number of single phase switching elements draw current. On the other hand, when an odd number of single phase switching blocks is used, at any given time, a different number of single phase switching elements draw current resulting in the variation of input current draw illustrated by signal 420. The greater the odd number N, the less the variation of the input current draw. In embodiments when it is more desirable to reduce input current ripple, an even number of single phase switching blocks may be used.

Signal 418 illustrates the output voltage of N single phase switching blocks when N is an even number. Signal 422 illustrates the output voltage of N single phase switching blocks when N is an odd number. An even number of single phase switching blocks provides greater output voltage ripple than an odd number of single phase switching blocks. In accordance with one embodiment of the present invention, an increased number of single phase switching blocks are used with increased current load requirements. In embodiments when it is more desirable to reduce output voltage ripple, an odd number of single phase switching blocks may be used. The greater the number of single phase switching blocks, the less the output ripple.

Figure 5A:
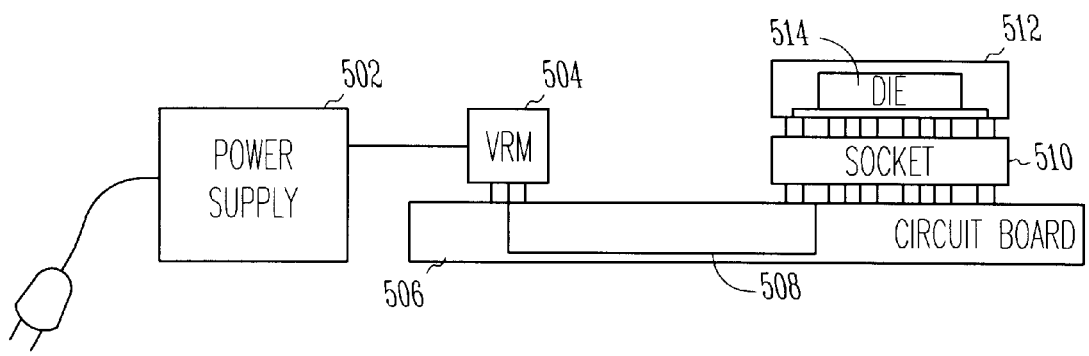
FIG. 5A illustrates a current path from a power supply to a semiconductor die.

FIG. 5A illustrates a current path from a power supply to a semiconductor die. Power supply 502 converts current, such as household 120 volt AC to a direct current (DC) for voltage regulation module (VRM) 504. Output voltage of power supply 502 may be between 5–12 volts. VRM 504 may be located on circuit board 506 and provide various regulated output voltages for various loads on circuit board 506. For example, VRM 504 may provide various positive and negative regulated voltages, such as −1.8 v, 1.5 v, 1.8 v etc. for various semiconductor dies. Current from VRM 504 flows through circuit board 506 through one or more current paths 508. Before reaching semiconductor die 514, current from VRM 504 may also flow through semiconductor die socket 510 and semiconductor die package 512. Semiconductor die 514 may have one or more internal power grids for distributing current to the various functional unit blocks residing thereon. Semiconductor die 514 has one or more multiphase power converters, such as multiphase power converter 100 (FIG. 1) or multiphase power converter 200 (FIG. 2) which supply current the functional unit blocks of the semiconductor die.

Figure 5B:
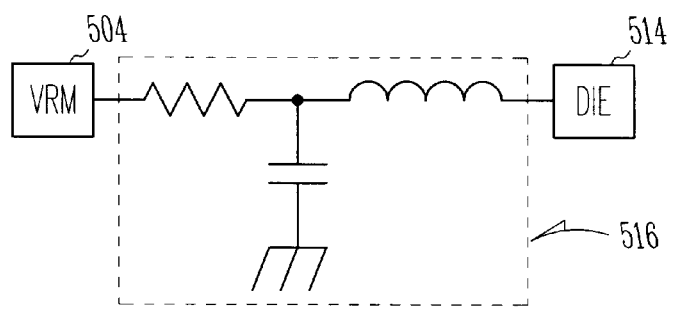
FIG. 5B illustrates parasitics associated with the current path between a voltage regulation module and a semiconductor die.

FIG. 5B illustrates parasites associated with the current path between a voltage regulation module and a semiconductor die in accordance with an embodiment of the present invention. Parasitic elements 516 illustrate a very simplified view of the losses associated with current path 508 between VRM 504 and semiconductor die 514. Parasitic elements 516 comprise series resistance, series inductance and shunt capacitance. Parasitic elements 516, among other things, increase voltage fluctuations at the semiconductor dies, and result in noise issues and power loss. With increasing current demand of semiconductor dies and reduced line widths, the effects of parasitic elements 516 become more enhanced.

The power supply grids of semiconductor dies typically have input voltage requirements that specify a maximum input voltage ripple. Because of parasitic elements 516, it is becoming increasing difficult to meet these requirements with VRM 504. The use of multiphase power converters in accordance with the embodiments of the present invention can improve voltage regulation to the functional unit blocks of the semiconductor die. The output voltage ripple requirements of VRM 504 might also be reduced. In addition, the output voltage of VRM 504 might be increased allowing for reduced current to flow through current path 508 reducing the effects of parasitic elements 516.

Figure 6:
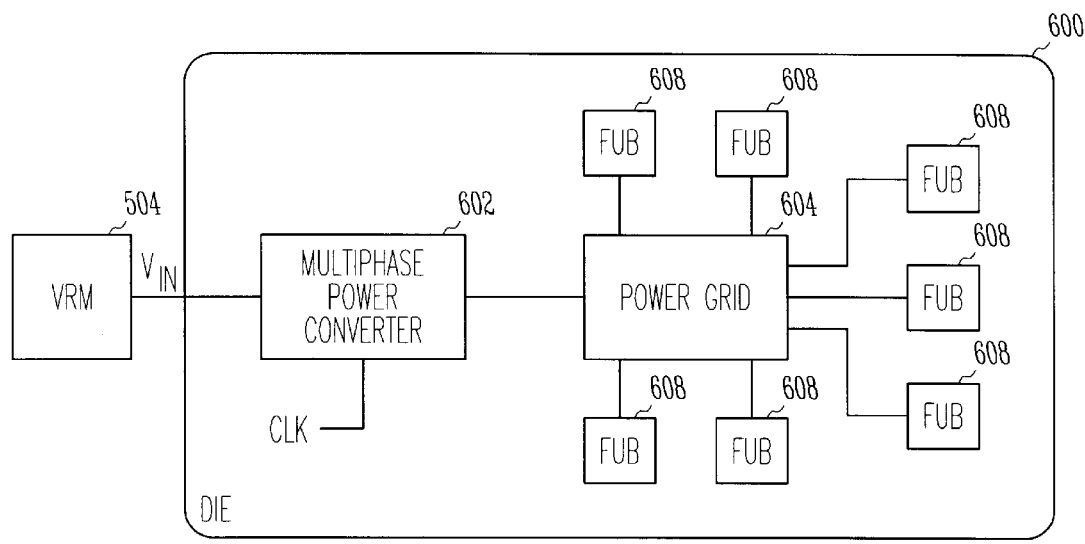
FIGS. 6, 7, 8, 9, 10, 11 and 12 are functional block diagrams of semiconductor dies in accordance with various embodiments of the present invention.

FIG. 6 is a functional block diagram of a semiconductor die in accordance with an embodiment of the present invention. Semiconductor die 600 includes multiphase power converter 602 which may receive a regulated output voltage from VRM 504 and provides an output voltage to power grid 604. Multiphase power converter 602 may be similar to multiphase power converter 100 (FIG. 1) and is fabricated on semiconductor die 600. Power grid 604 on semiconductor die supplies current to functional unit blocks (FUBs) 608. FUBs may be any functional element fabricated on semiconductor die 600 and may include, for example, memory, cache, a register file, a scheduler, a multiplier, an adder, a shifter, an ALU, I/O, a microprocessor, etc. Multiphase power converter 602 provides current in accordance with the requirements of the specific FUBs 608 it is coupled with.

In one embodiment of the present invention, multiphase power converter 602 is coupled directly to one or more of FUBs 608 without power grid 604. In another embodiment of the present invention, semiconductor die 600 includes at least another multiphase power converter to provide power to another group of FUBs.

Figure 7:
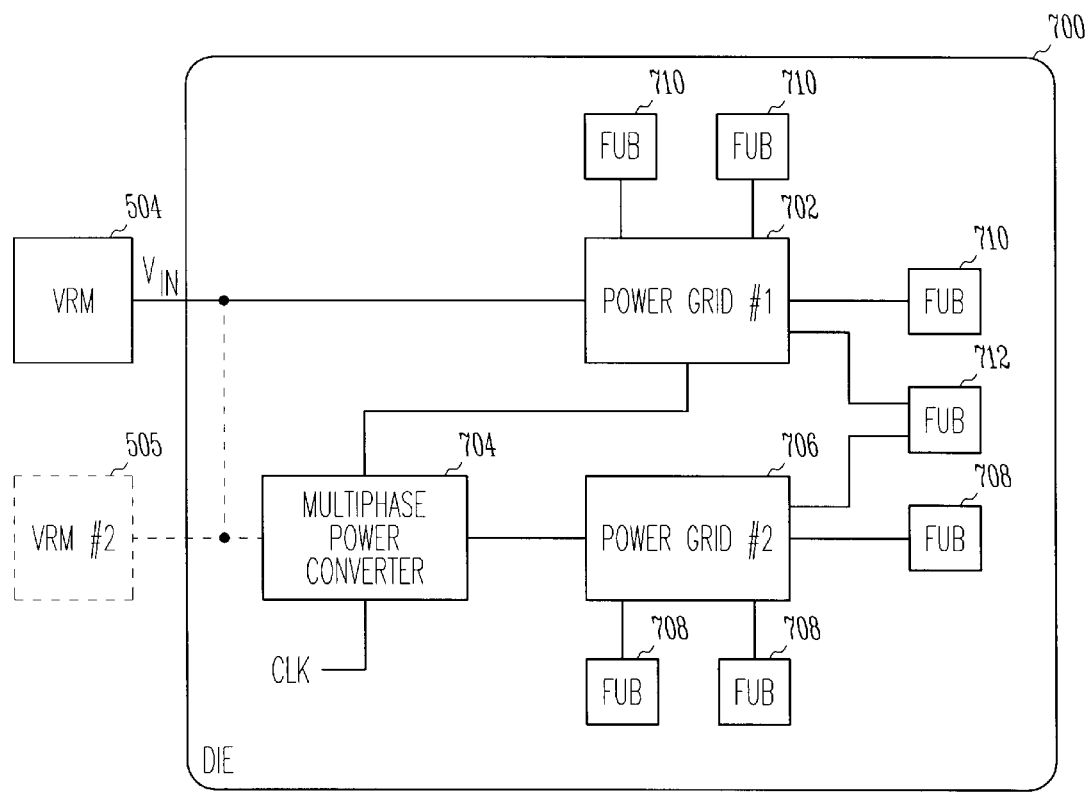

FIG. 7 is a functional block diagram of a semiconductor die with a multiphase power converter in accordance with an embodiment of the present invention. In this embodiment, semiconductor die 700 includes first power grid 702 which may receive a regulated input voltage from VRM 504. Multiphase power converter 704 draws input current from first power grid 702 and provides output current to second power grid 706. First power grid 702 may supply current to a first group of FUBs 710 while second power grid may supply current to a second group of FUBs 708. Some FUBs, such as FUB 712 may receive current from both the first and second power grids 702, 706. This embodiment of the present invention is useful for providing different voltages on a die or providing, for example, improved voltage ripple on power grid 706. In this embodiment of the present invention, multiphase power converter 704 may be similar to multiphase power converter 100 (FIG. 1). In one embodiment, multiphase power converter 704 may draw input current from VRM 504 rather than from first power grid 702. In another embodiment, multiphase power converter 704 may draw input current from another VRM 505.

The various embodiments of the present invention may be used to conserve energy on a semiconductor die. For example, during an energy conservation mode, multiphase power converter 704 may reduce the voltage supplied to non-critical path FUBs. Other FUBs, such as FUBs 710 may be critical path FUBs and may continue to receive full voltage from VRM 504 or another on-die source.

Figure 8:
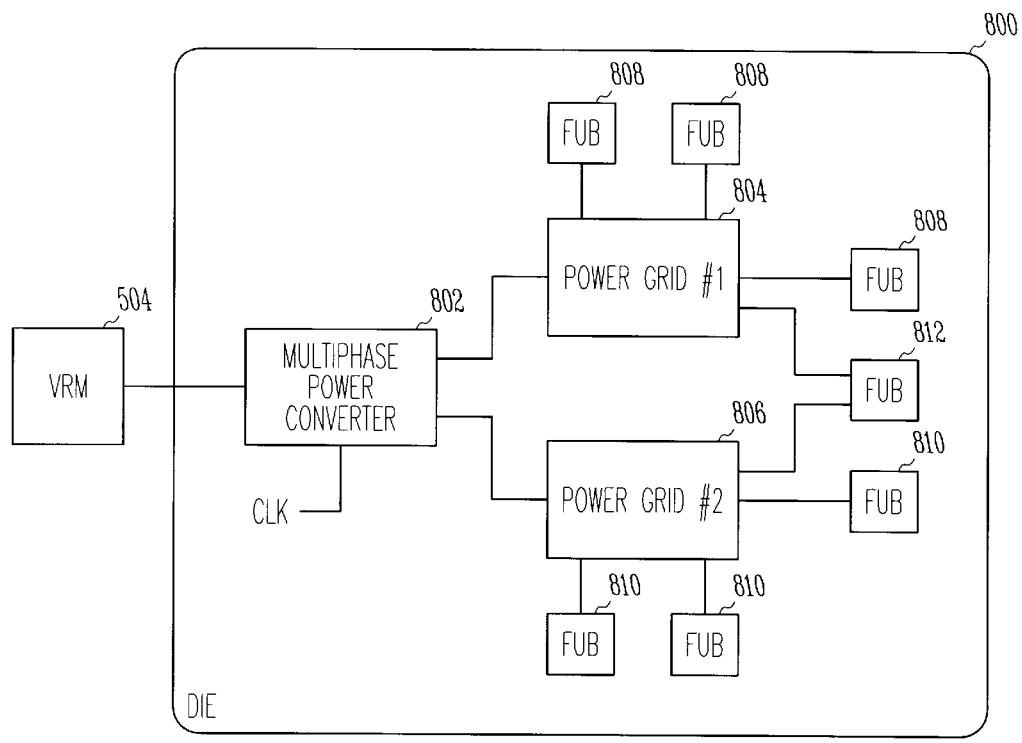

FIG. 8 is a functional block diagram of a semiconductor die with a multiphase power converter in accordance with an embodiment of the present invention. In this embodiment, semiconductor die 800 includes multiphase power converter 802 which receives input current from VRM 504 and provides output voltages to first power grid 804 and second power grid 806. First power grid 804 provides current to FUBs 808 and second power grid provides current to FUBs 810. FUB 812 may receive current from both first and second power grids. Multiphase power converter 200 (FIG. 2) may be used for multiphase power converter 802. First power grid 804 may be substantially the same voltage as second power gird 806 however the number of single phase switching blocks 110 (FIG. 2) providing current to the power grids may differ depending on the current demand of the FUBs drawing current from the associated power grid. Multiphase power converter 802 may also provide a different output voltage level on first power grid 804 than on second power grid 806. In accordance with these embodiments, a first portion of the phase-shifted clock signals is provided to a first portion of single phase switching blocks 110 (FIG. 2) which provide the first output voltage (Vo1) to first power grid 804. A second portion of the phase-shifted clock signals is provided to a second portion of single phase switching blocks 110 (FIG. 2) which provide the second output voltage (Vo2) to second power grid 806. Although not illustrated, semiconductor die 800 may include more than two power grids receiving more than two output voltages from multiphase power converter 802.

Figure 9:
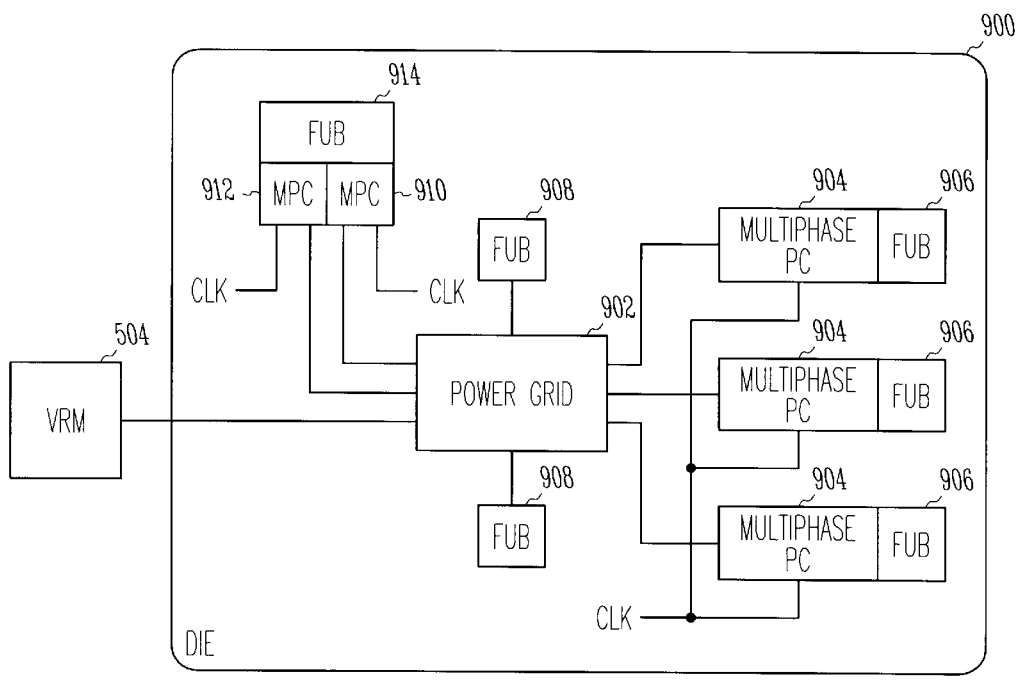

FIG. 9 is a functional block diagram of a semiconductor die in accordance with an embodiment of the present invention. In this embodiment, semiconductor die 900 includes power grid 902 which receives input current from VRM 504 and provides current to a plurality of multiphase power converters (MPCs) 904. Each MPC 904 may supply current to an associated one or more FUBs 906. Each MPC 904 may be similar to multiphase power converter 100 (FIG. 1). In one embodiment, power grid 902 may also provide current directly to FUBs 908. Semiconductor die 900 may also include MPC 910 and 912 which may receive current from power grid 902. Both MPCs 910 and 912 may provide output voltages to FUB 914 which may, for example require several input voltages, have a high current demand or have reduced input voltage ripple requirements. MPCs 910 and 912 may be similar to multiphase power converter 100 (FIG. 1). The clock signals provided to multiphase power converters 904, 910 and 912 may be independently generated or may be commonly generated.

Figure 10:
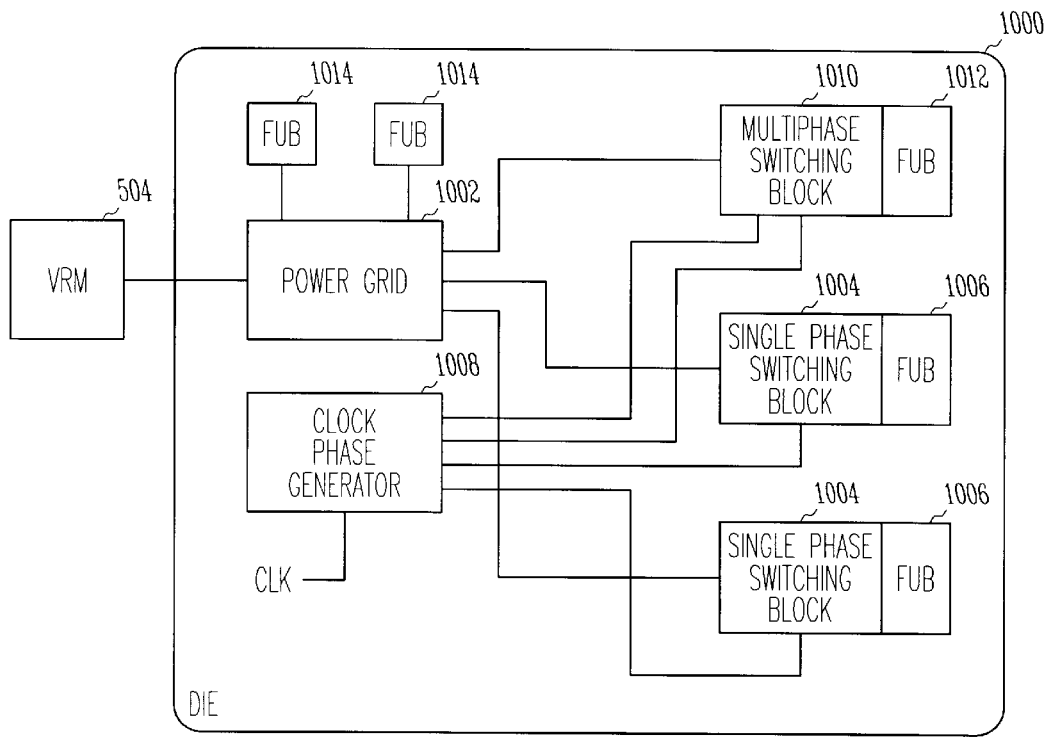

FIG. 10 is a functional block diagram of a semiconductor die in accordance with an embodiment of the present invention. In this embodiment, semiconductor die 1000 includes power grid 1002 which draws current from VRM 504 to provide current to one or more single phase switching blocks 1004 which provide output current to an associated FUB 1006. Clock phase generator 1008 provides phase-shifted clock signals to single phase switching blocks 1004. Single phase switching blocks 1004 may be similar to single phase switching blocks 110 (FIG. 2) and clock phase generator 1008 may be similar to clock phase generator 108 (FIG. 2). In this embodiment, semiconductor die 1000 also may include multiphase switching block 1010 to provide current for FUB 1012. Multiphase switching block 1010 has at least two single phase switching blocks. Clock phase generator 1008 provides a phase-shifted clock signal to each single phase switching block 1004 and to each single phase switching block of multiphase switching block 1010. In accordance with one embodiment, it is desirable for each of the single phase switching blocks 1004 and each single phase switching block in multiphase switching block 1010 to draw similar input current so that, for example, a substantially constant input current for all phases of the clock signal is drawn. FUBs 1014 may also couple directly to power grid 1002 as illustrated, and may have more than one power grid (not illustrated).

Figure 11:
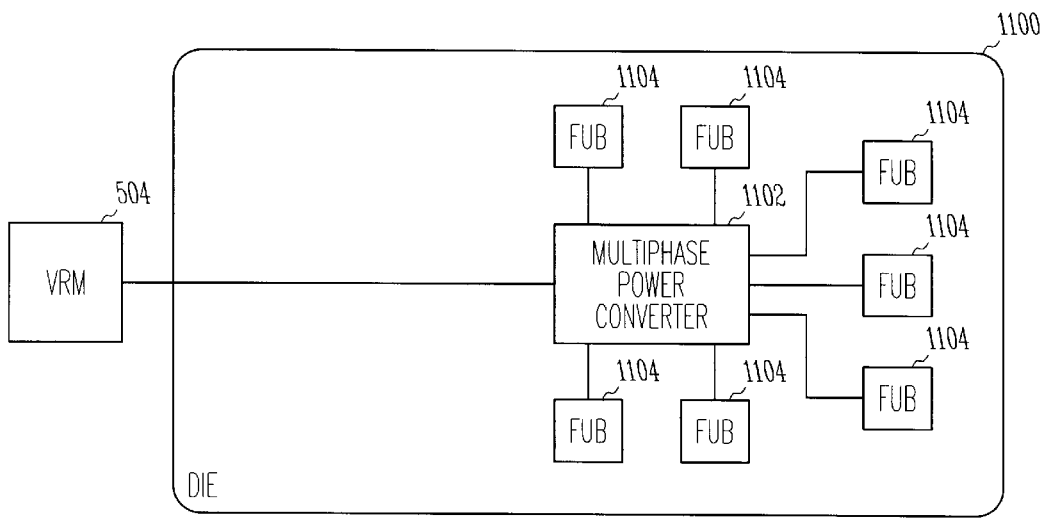

FIG. 11 is a functional block diagram of a semiconductor die with a multiphase power converter in accordance with an embodiment of the present invention. In this embodiment, multiphase power converter 1102 receives input current from VRM 504 and provides output voltages to a plurality of FUBs 1104. Multiphase power converter 1102 is comprised of a plurality of single phase switching blocks and each FUB may receive an output voltage from one or more of the single phase switching blocks. In this embodiment, multiphase power converter 1102 may be similar to multiphase power converter 200 (FIG. 2) where outputs from one or more single phase switching blocks 110 (FIG. 2) provide current for one or more functional unit blocks. Semiconductor die 1100 may include a power grid (not shown) between VRM 504 and multiphase power converter 1102. Semiconductor die 1100 may also include more than one multiphase power converter 1102 supplying current to other FUBs.

Figure 12:
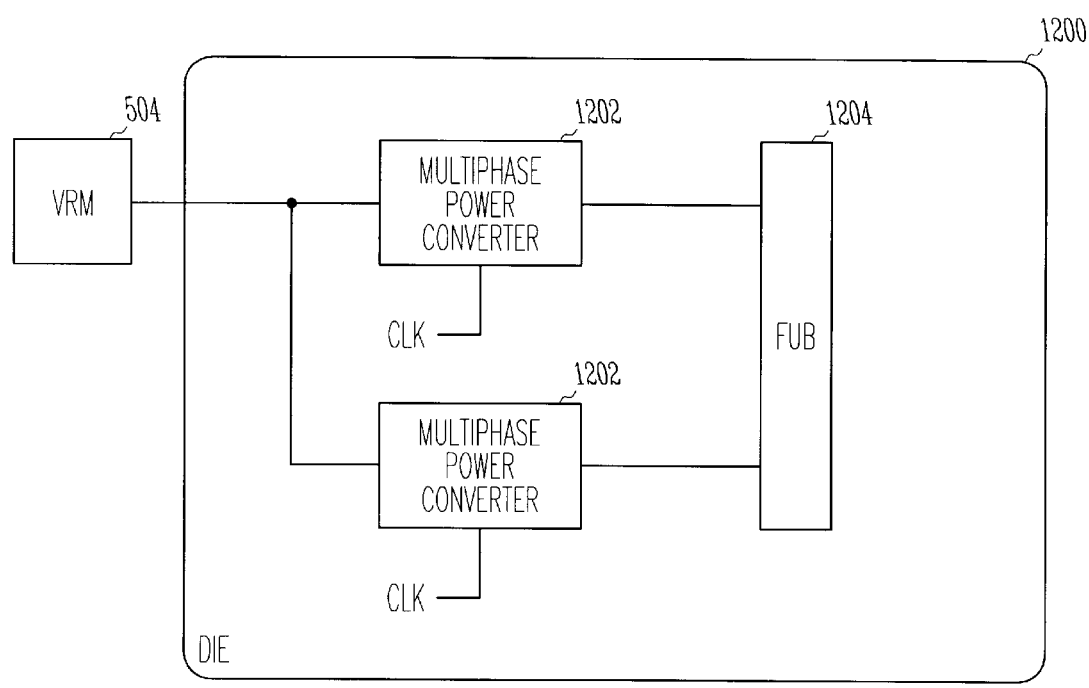

FIG. 12 is a functional block diagram of a semiconductor die in accordance with an embodiment of the present invention. In this embodiment, semiconductor die 1200 includes a plurality of multiphase power converters 1202 to supply current to single FUB 1204. Multiphase power converters 1202 may be similar to multiphase power converter 100 (FIG. 1). Although several embodiments of the semiconductor die of the present invention are illustrated in FIGS. 6–12, the semiconductor die of the present invention includes other combinations not illustrated in FIGS. 6–12.

Figure 13:
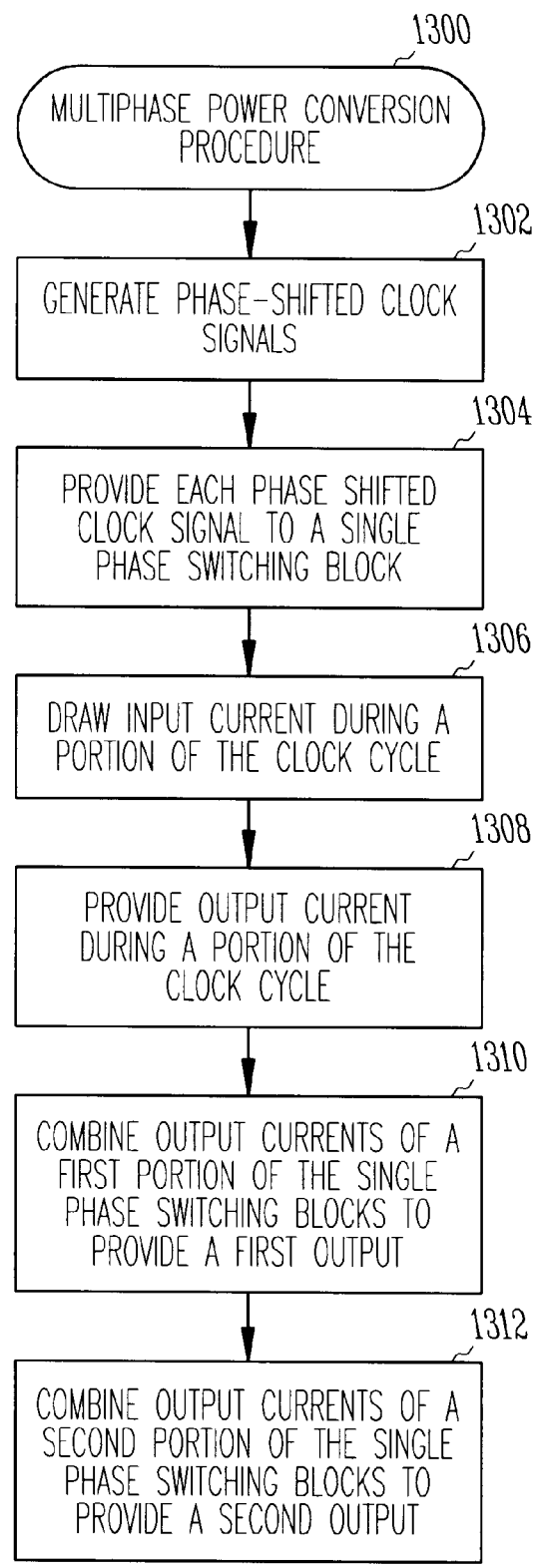
FIG. 13 is a flow chart of a multiphase power conversion procedure in accordance with an embodiment of the present invention.

FIG. 13 is a flow chart of a multiphase power conversion procedure in accordance with an embodiment of the present invention. Procedure 1300 may be performed by a multiphase power converter such as multiphase power converter 100 (FIG. 1) or multiphase power converter 200 (FIG. 2). Procedure 1300 provides a method for converting or regulating voltage for one or more functional unit blocks of a semiconductor die. Operation 1302 generates a plurality of phase-shifted clock signals. Each phase-shifted clock signal may have a period (T) and may be shifted in phase by an amount substantially equal to T/N. N may be the number of single phase switching elements to receive one of the phase-shifted clock signals.

Operation 1304 provides each phase-shifted clock signal to one or several of the single phase switching blocks. In operation 1306, each single phase switching block may draw input current during a portion of the clock cycle. The input current drawn by a single phase switching block is shifted in phase in by a multiple of T/N compared to the current draw by other of the single phase switching blocks associated with other clock phases.

Operation 1308 provides output current by each single phase switching block during one or more portions of a clock cycle. The output current provided by each single phase switching blocks is shifted in phase by a multiple T/N from the current supplied by other of the single phase switching blocks.

Operation 1310 combines, in one embodiment of the present invention, the outputs of at least some of the single phase switching blocks to provide a regulated input voltage for functional unit blocks. In one embodiment, when a multiphase switching block such as multiphase switching block 100 (FIG. 1) performs operation 1310, the outputs of all the single phase switching blocks may be combined. In another embodiment, when a multiphase switching block, such as multiphase switching block 200 (FIG. 2) performs operation 1310, the outputs of groups of single phase switching blocks are combined. In this embodiment, operation 1310 combines outputs of a first group of the single phase switching blocks and operation 1312 combines outputs of a second group of the single phase switching blocks. Multiphase switching block 200 (FIG. 2) illustrates the combining of outputs of groups of single phase switching blocks 110 (FIG. 2) to provide, for example, more than one output voltage.

An improved power converter and improved power conversion method have been described. The impact of scaling on power delivery is reduced by allowing a higher external power supply voltage with lower input current levels at the pins of a semiconductor die package by providing an on-die DC to DC power converter to generate the lower voltage and higher current required for the on-die circuitry. Reduced input noise and output ripple have also been achieved. The on-die power converter and power conversion method of the present invention also reduce area on a semiconductor die without reducing power converter performance. The on-die power converter and power conversion method of the present invention also allow circuit board voltage regulation modules to provide higher voltage and lower current levels reducing the effects of parasitics. The on-die power converter and power conversion method of the present invention also improve interconnect reliability.

The on-die power converter and power conversion method of the present invention may also significantly reduce input current fluctuations by using distributed switching blocks. Hence, requirements on input filtering are reduced significantly. The various embodiments of the present invention may alleviate the need for an input filter and reduce semiconductor die area. Depending on the particular embodiment, the present invention may achieve significantly smaller output voltage ripple. Hence, requirements on output filtering are reduced and die area is saved. The on-die power converter and power conversion method of the present invention also may lower input and output noise at equal semiconductor die area occupied by switches and storage elements, and may perform equally in terms of the maximum output current and conversion efficiency.

The on-die power converter and power conversion method of the present invention also allow adjustment of the number of single phase switching blocks, phase, frequency, and duty-cycle of the phases, to achieve improved conversion efficiency over typical DC to DC converters. In addition, the single phase switching blocks may be distributed at different locations on the die to alleviate thermal problems caused by localized high-power consumption (hot spots). Single phase or multiphase switching blocks may deliver power to a single power grid or can be assigned to support a particular functional unit block or group of functional unit blocks.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. An on-die power converter comprising:
   a plurality of single phase switching blocks fabricated on a semiconductor die to receive phase-shifted clock signals and to provide an output voltage;
   a clock signal phase generator fabricated on the semiconductor die to provide one of the phase-shifted clock signals to each of the single phase switching blocks; and
   one or more functional unit blocks on the semiconductor die to receive the output voltage, wherein the single phase switching blocks each have switching elements comprised of PMOS and NMOS FETs and a charge storage element comprised of one or more of either PMOS and NMOS FETs, the charge storage element utilizing a gate capacitance of the one or more either PMOS or NMOS FETS for storing charge during portions of the phase shifted clock signals, the PMOS and NMOS FETs of the switching elements and the one or more either PMOS or NMOS FETs of the charge storage element fabricated with a CMOS process on the semiconductor die.

2. The power converter as claimed in claim 1, wherein each phase-shifted clock signal has a period (T), wherein the plurality of single phase switching blocks is comprised of N single phase switching blocks, and wherein each phase-shifted clock signal is shifted in phase by an amount substantially equal to T/N, wherein an area of the semiconductor die occupied by the single phase switching blocks is substantially independent of a number of single phase switching blocks, each switching block occupying less area for a larger numbers of switching blocks and occupying a greater area for a lower number of switching blocks.

3. An on-die power converter comprising:
   a plurality of single phase switching blocks to receive phase-shifted clock signals and to provide an output voltage;
   a clock signal phase generator to provide one of the phase-shifted clock signals to each of the single phase switching blocks; and
   one or more functional unit blocks on the die to receive the output voltage,
      wherein each phase-shifted clock signal has a period (T), wherein the plurality of single phase switching blocks is comprised of N single phase switching blocks, and wherein each phase-shifted clock signal is shifted in phase by an amount substantially equal to T/N, and wherein at least one single phase switching block of the plurality is comprised of first and second switching elements and a charge storage element, wherein the first switching element supplies energy to the charge storage element at least during a first portion of the phase-shifted clock signal to draw input current, and the second switching element removes energy from the charge storage element at least during a second portion of the phase-shifted clock signal to provide output current.

4. The power converter as claimed in claim 3 wherein each single phase switching block of the plurality draws current during periods in time, each period being shifted by T/N.

5. The power converter as claimed in claim 3, wherein each single phase switching block of the plurality further comprises third and fourth switching elements coupled to the charge storage element, the first and fourth switching elements conducting during the first portion of the phase-shifted clock signal, the second and third switching elements conducting during the second portion of the phase-shifted clock signal.

6. The power converter as claimed in claim 1, wherein the power converter provides the output voltage to a power grid of the semiconductor die coupled to the plurality of functional unit blocks.

7. An on-die power converter comprising:
   a plurality of single phase switching blocks to receive phase-shifted clock signals and to provide an output voltage;

a clock signal phase generator to provide one of the phase-shifted clock signals to each of the single phase switching blocks; and one or more functional unit blocks on the die to receive the output voltage, wherein the plurality of single phase switching blocks and the clock signal phase generator are fabricated as part of a semiconductor die, and wherein the functional unit block is one of a plurality of functional unit blocks fabricated on the semiconductor die, and wherein the semiconductor die has a first and second power grid, the first power grid receiving input current from an external power source and coupled to a first group of the functional unit blocks, and power converter providing the output voltage to the second power grid, and wherein the second power grid provides current for a second group of the functional unit blocks.

8. An on-die power converter comprising:

a plurality of single phase switching blocks to receive phase-shifted clock signals and to provide an output voltage;

a clock signal phase generator to provide one of the phase-shifted clock signals to each of the single phase switching blocks; and one or more functional unit blocks on the die to receive the output voltage, wherein the plurality of single phase switching blocks and the clock signal phase generator are fabricated as part of a semiconductor die, and wherein the semiconductor die has a first and second power grid and a plurality of functional unit blocks, and wherein first and second groups of the single phase switching blocks provides respective output voltages to the first and second power grids, and wherein first and second groups of the functional unit blocks receive current C respectively from the first and second power grids.

9. The power converter as claimed in claim 8, wherein the clock signal phase generator provides a first portion of the phase-shifted clock signals to the first portion of single phase switching blocks and a second portion of the phase-shifted clock signals to the second portion of single phase switching blocks.

10. The power converter as claimed in claim 2, wherein the number of single phase switching blocks is selected to provide an output voltage with reduced ripple.

11. A semiconductor die comprising:

a power grid;

a plurality of functional unit blocks to draw current from the power grid;

a multiphase power converter fabricated on the single semiconductor die to provide a regulated output voltage to the power grid, the multiphase power converter comprising a plurality of single phase switching blocks to receive phase-shifted clock signals, and a clock signal phase generator to provide the phase-shifted clock signals to the single phase switching blocks, wherein the single phase switching blocks each have switching elements comprised of PMOS and NMOS FETs and a charge storage element comprise of one or more of either PMOS and NMOS FETs, the charge storage element utilizing a gate capacitance of the one or more either PMOS or NMOS FETS for storing charge during portions of the phase shifted clock signals, the PMOS and NMOS FETs of the switching elements and the one or more either PMOS or NMOS FETs of the charge storage element fabricated with a CMOS process on the semiconductor die.

12. The semiconductor die as claimed in claim 11, wherein an area of the semiconductor die occupied by the single phase switching blocks is substantially independent of a number of single phase switching blocks, each switching block occupying less area for a larger number of single phase switching blocks and occupying greater area for a lower number of single phase switching blocks, and wherein the number of single phase switching blocks is selected to provide an output voltage with reduced ripple.

13. The semiconductor die as claimed in claim 12, wherein each phase-shifted clock signal has a period (T), wherein the plurality of switching blocks is comprised of N switching blocks, and wherein each phase-shifted clock signal is shifted in phase by an amount substantially equal to T/N.

14. The semiconductor die as claimed in claim 13, wherein the multiphase power converter is a first multiphase power converter, and the semiconductor die has a second multiphase power converter fabricated thereon, the second multiphase power converter to provide input power for other functional unit blocks.

15. The semiconductor die as claimed in claim 14, wherein one of the functional unit blocks of the plurality receives current directly from the power grid, and wherein another one of the functional unit blocks receives power from more than one of the multiphase power converters.

16. A single semiconductor die comprising:

a functional unit block;

a multiphase power converter to provide an output voltage to the functional unit block on the single semiconductor die, wherein the functional unit block is one of a plurality of functional unit blocks, and the multiphase power converter is one of a plurality of multiphase power converters, each multiphase power converter coupled to one of the functional unit blocks, wherein the semiconductor die further comprises a power grid for providing current to the plurality of multiphase power converters, wherein one of the functional unit blocks of the plurality receives current directly from the power grid, wherein another one of the functional unit blocks receives power from more than one of the multiphase power converters, wherein each single phase switching block of the plurality is comprised of first and second switching elements and a charge storage element, wherein the first switching element supplies energy to the charge storage element at least during a first portion of the phase-shifted clock signal to draw input current, and a the second switching element removes energy from the charge storage element at least during a second portion of the phase-shifted clock signal to provide output current.

17. The semiconductor die as claimed in claim 12, wherein the power grid is a first power grid, and the semiconductor die further comprises a second power grid, wherein:

the second power grid to receive input current from an external power source and provide input current to the multiphase power converter, the second power grid to provide power to a first group of the plurality of functional unit blocks; and the first power grid is coupled to an output of the multiphase power converter, the first power grid to provide the output voltage to a second group of the plurality of functional unit blocks.

18. The semiconductor die as claimed in claim 12, wherein the first power grid receives a first voltage output of the multiphase power converter and to provide power to a first group of the plurality of functional unit blocks, and wherein the semiconductor die further comprises a second power grid coupled to a second voltage output of the multiphase power converter to provide power to a second group of the plurality of functional unit blocks.

19. A semiconductor die comprising:

a plurality of functional unit blocks;

a plurality of single phase switching blocks fabricated on the semiconductor die to provide power to corresponding ones of the functional unit blocks; and a clock signal phase generator to provide phase-shifted clock signals to each of the single phase switching blocks, wherein the single phase switching blocks receive an input voltage from an power grid of the semiconductor die, wherein an area of the semiconductor die occupied by the single phase switching blocks is substantially independent of a number of single phase switching blocks, each switching block occupying less area for a larger number of single phase switching blocks and occupying greater area for a lower number of single phase switching blocks, and wherein the number of singe phase switching blocks is selected to provide an output voltage with reduced ripple.

20. The semiconductor die as claimed in claim 19, further comprising a multiphase switching block to provide power to a corresponding one of the functional unit blocks, the multiphase switching block receiving at least two of the phase-shifted clock signals from the clock signal phase generator, wherein the single phase switching blocks and the multiphase switching block each have switching elements comprised of PMOS and NMOS FETs and a charge storage element comprised of one or more of either PMOS and NMOS FETs, the charge storage element utilizing a gate capacitance of the one or mare either PMOS or NMOS FETS for storing charge during portions of the phase shifted clock signals, the PMOS and NMOS FETs of the switching elements and the one or more either PMOS or NMOS FETs of the charge storage element fabricated with a CMOS process on the semiconductor die.

21. The semiconductor die as claimed in claim 20, wherein the plurality of single phase switching blocks is a first plurality, wherein the multiphase switching block is comprised of a second plurality of single phase switching blocks, wherein each single phase switching block of the first and second pluralities receives at least one phase-shifted clock signal from the clock signal phase generator, and wherein a number of single; phase switching blocks of the first plurality and a number of single phase switching blocks of the second plurality are selected to provide respective output voltages with reduced ripple.

22. A semiconductor die comprising:

a plurality of functional unit blocks;

a plurality of single phase switching blocks to provide power to corresponding ones of the functional unit blocks;

a clock signal phase generator to provide a phase-shifted clock signal to each of the single phase switching blocks;

a multiphase switching block to provide power to a corresponding one of the functional unit blocks, the multiphase switching block receiving at least two phase-shifted clock signals from the clock signal phase generator, wherein the plurality of single phase switching blocks is a first plurality, wherein the multiphase switching block is comprised of a second plurality of single phase switching blocks, wherein each single phase switching block of the first and second pluralities receives at least one phase-shifted clock signal from the clock signal phase generator, wherein each phase-shifted clock signal has a period (T), wherein the single phase switching blocks of the first and second pluralities comprise N single phase switching blocks, and wherein each phase-shifted clock signal is shifted in phase by an amount substantially equal to T/N, and wherein each single phase switching block of the plurality is comprised of first and second switching elements and a charge storage element, wherein the first switching element supplies energy to the charge storage element during at least a first portion of the phase-shifted clock signal to draw input current, and a the second switching element removes energy from the charge storage element at least during a second portion of the phase-shifted clock signal to provide output current.

23. A method performed on a semiconductor die for providing voltage to functional unit blocks of the semiconductor die comprising:

generating a plurality of phase-shifted clock signals on the semiconductor die;

providing each phase-shifted clock signal to at least one of a plurality of single phase switching blocks on the semiconductor die;

providing an output voltage by each single phase switching block during a portion of a clock cycle; and combining the output voltages of the single phase switching blocks to provide an input voltage for the functional unit blocks, wherein the single phase switching blocks each have switching elements comprised of PMOS and NMOS FETs and a charge storage element comprised of one or more of either PMOS and NMOS FETs, the charge storage element utilizing a gate capacitance of the one or more either PMOS or NMOS FETS for storing charge during portions of the phase shifted clock signals, the PMOS and NMOS FETs of the switching elements and the one or more either PMOS or NMOS FETs of the charge storage element fabricated with a CMOS process on the semiconductor die.

24. The method as claimed in claim 23, wherein each phase-shifted clock signal has a period (T), wherein the plurality of single phase switching blocks is comprised of N single phase switching blocks, and wherein each phase-shifted clock signal is shifted in phase by an amount substantially equal to T/N.

25. The method as claimed in claim 23, further comprising:
  drawing input current by each single phase switching block during at least a first portion of the clock cycle; and
  providing an output current by each single phase switching block during at least a second portion of the clock cycle,
  wherein an area of the semiconductor die occupied by the single phase switching blocks is substantially independent of the number of single phase switching blocks, each switching block occupying less area for a larger number of single phase switching blocks and occupying greater area for a lower number of single phase switching blocks, and
  wherein the number of single phase switching blocks is selected to provide an output voltage with reduced ripple.

26. A method performed on a semiconductor die for providing voltage to functional unit blocks of the semiconductor die comprising:
  generating a plurality of phase-shifted clock signals;
  providing each phase-shifted clock signal to at least one of a plurality of single phase switching blocks;
  providing an output voltage by each single phase switching block during a portion of a clock cycle; and
  combining the output voltages of the single phase switching blocks to provide an input voltage for the functional unit blocks, wherein each phase-shifted clock signal has a period (T), wherein the plurality of single phase switching blocks is comprised of N single phase switching blocks, and wherein each phase-shifted clock signal is shifted in phase by an amount substantially equal to T/N;
  drawing input current by each single-phase switching block during at least a first portion of the clock cycle;
  providing an output current by each single phase switching block during at least a second portion of the clock cycle;
  combining the output currents from a first group of the single phase switching blocks to provide a first output for a first plurality of functional unit blocks; and
  combining the output currents from a second group of the single phase switching blocks to provide a second output for a second plurality of functional unit blocks.

27. A method performed on a semiconductor die for providing voltage to functional unit blocks of the semiconductor die comprising:
  generating a plurality of phase-shifted clock signals;
  providing each phase-shifted clock signal to at least one of a plurality of single phase switching blocks;
  providing an output voltage by each single phase switching block during a portion of a clock cycle;
  combining the output voltages of the single phase switching blocks to provide an input voltage for the functional unit blocks; and
  reducing the input voltage for the functional unit blocks during a power conservation mode,
  wherein critical path functional unit blocks receive power from another voltages source during the power conservation mode.

* * * * *

UNITED STATES PATENT AND TRADEMARK OFFICE
CERTIFICATE OF CORRECTION

PATENT NO. : 6,600,296 B2 Page 1 of 1
DATED : July 29, 2003
INVENTOR(S) : Peter Hazucha It is certified that error appears in the above-identified patent and that said Letters Patent is hereby corrected as shown below:

Column 13,
Line 37, delete "C" after "current.

Signed and Sealed this

Third Day of August, 2004

JON W. DUDAS
*Acting Director of the United States Patent and Trademark Office*